(12) United States Patent
Demar et al.

(10) Patent No.: US 7,647,703 B2
(45) Date of Patent: Jan. 19, 2010

(54) BULB PLANTER WITH TWIN GRIPS

(75) Inventors: David Demar, Tenafly, NJ (US);
Thomas VanDyk, Ramsey, NJ (US);
Roland Charriez, Mohegan Lake, NY (US); Michael Ballone, New Providence, NJ (US); John Kiely, Morris Plains, NJ (US); Keith Kristiansen, Stratford, CT (US); Melissa Fisher, Columbus, OH (US); Brian J. Conaway, Columbus, OH (US); Mandi Reese, Westerville, OH (US); Terry M. Birchler, New Albany, OH (US); Mark C. Eyman, Columbus, OH (US)

(73) Assignee: Ames True Temper, Inc., Camp Hill, PA (US)

( * ) Notice: Subject to any disclaimer, the term of this patent is extended or adjusted under 35 U.S.C. 154(b) by 657 days.

(21) Appl. No.: 11/095,372

(22) Filed: Mar. 31, 2005

(65) Prior Publication Data
US 2005/0241155 A1    Nov. 3, 2005

Related U.S. Application Data

(60) Provisional application No. 60/567,384, filed on Apr. 30, 2004.

(51) Int. Cl.
*B26B 3/04* (2006.01)
(52) U.S. Cl. .................. 30/301; 30/174; 30/305; 30/315; 111/92; 111/106; 172/22; 172/378
(58) Field of Classification Search ............. 30/174, 30/301, 305, 314, 315, 316; 111/92, 106, 111/114; 172/22, 378
See application file for complete search history.

(56) References Cited

U.S. PATENT DOCUMENTS

| 934,029 | A | * | 9/1909 | West ..................... 175/316 |
| 1,829,107 | A | * | 10/1931 | Nuerwell ................ 111/101 |
| 2,014,311 | A | * | 9/1935 | Council .................. 111/101 |
| 2,325,031 | A | * | 7/1943 | Berns ..................... 30/174 |
| 2,864,645 | A | * | 12/1958 | Roy ....................... 294/106 |
| 4,489,969 | A | * | 12/1984 | Merry ................... 294/50.8 |
| 5,746,579 | A | * | 5/1998 | Amos et al. ........... 416/204 A |

* cited by examiner

*Primary Examiner*—Timothy V Eley
(74) *Attorney, Agent, or Firm*—Eckert Seamans Cherin & Mellot, LLC; David C. Jenkins, Esq.

(57) ABSTRACT

A bulb planter includes a pair of blade halves cooperating to form a tubular tool head and a molded plastic handle body forming a pair of handles. The blade halves are preferably metal and riveted to the handle body. The handle body forms a living hinge for selectively pivoting the blade halves upon movement of the handles. The blade halves pivot toward and away from each other between a soil plug cutting position and a soil plug releasing position upon movement of the handles. A resilient member biases the blade halves toward the soil plug cutting position. The resilient member is preferably an elastomer ring encircling the blade halves. The handles extend in opposed directions substantially perpendicular to a central longitudinal axis and are manually movable against the bias of the resilient member to move the blade halves to the soil plug release position.

23 Claims, 5 Drawing Sheets

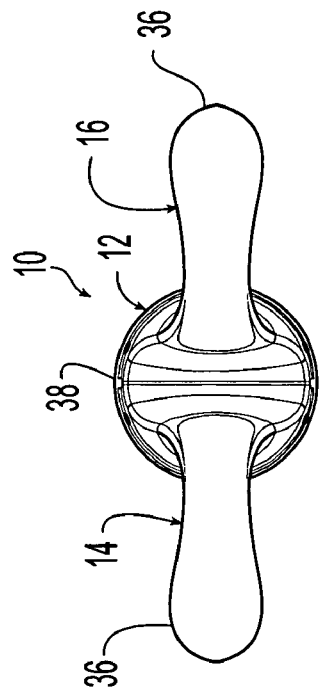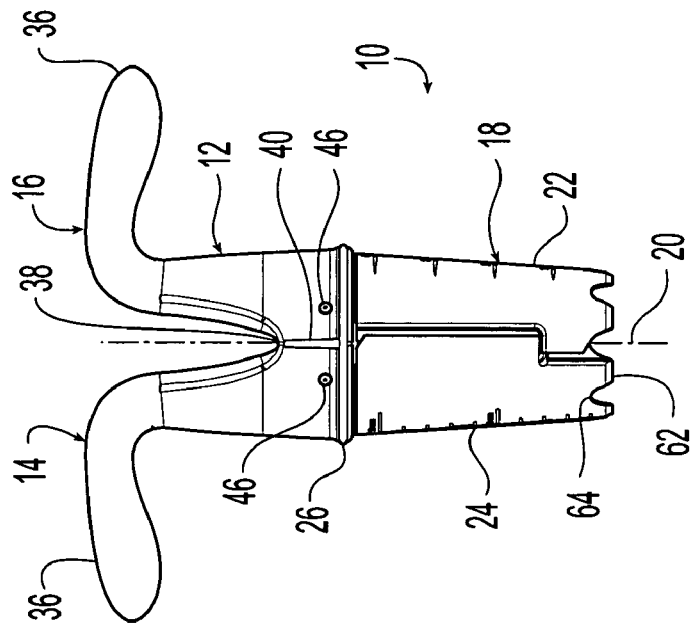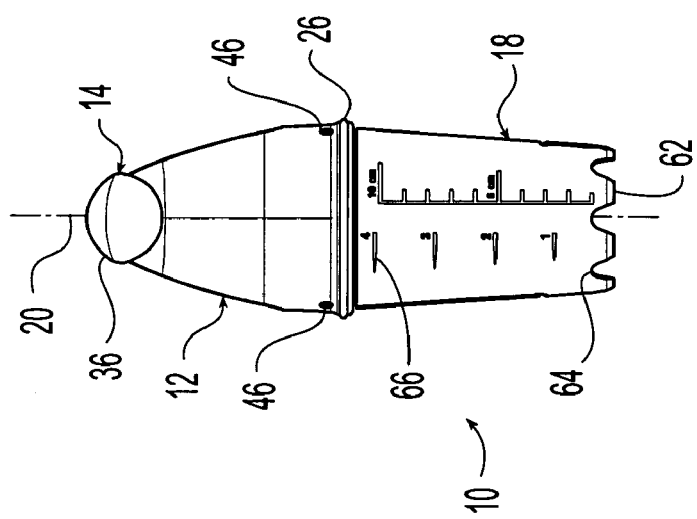

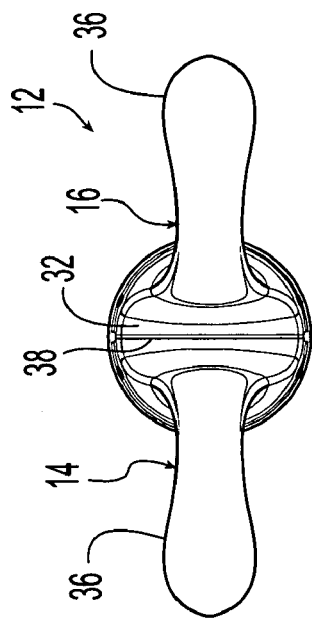
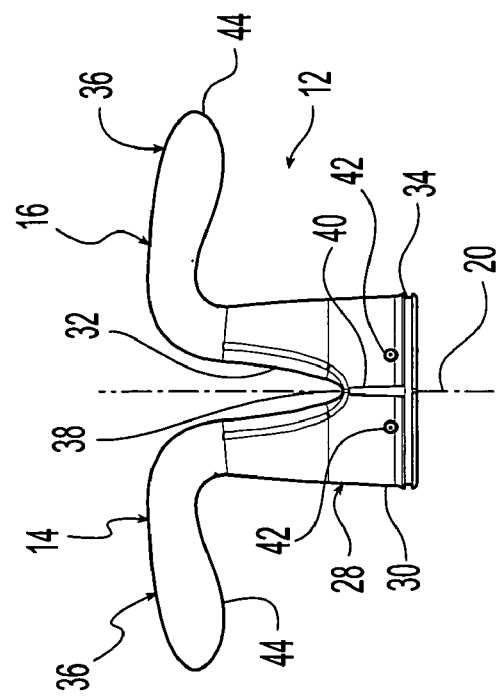
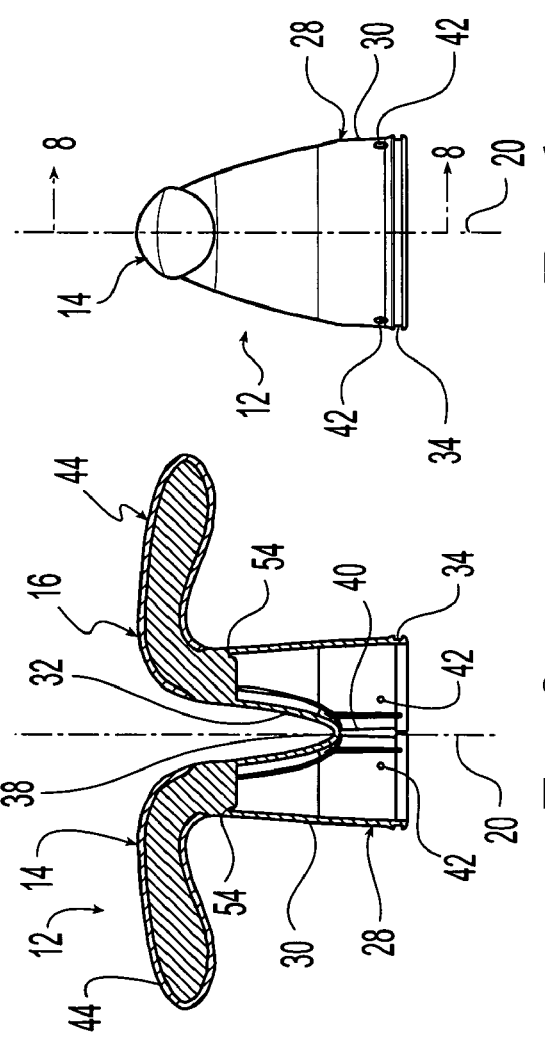

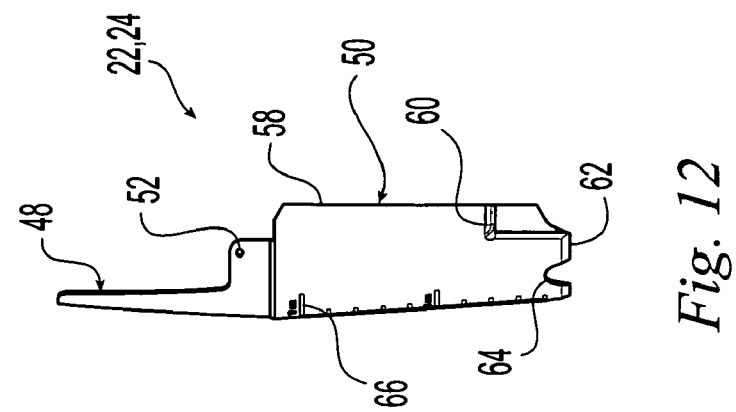
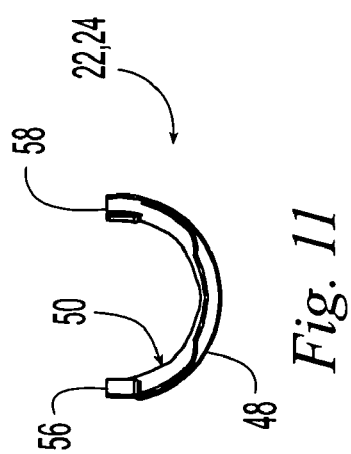
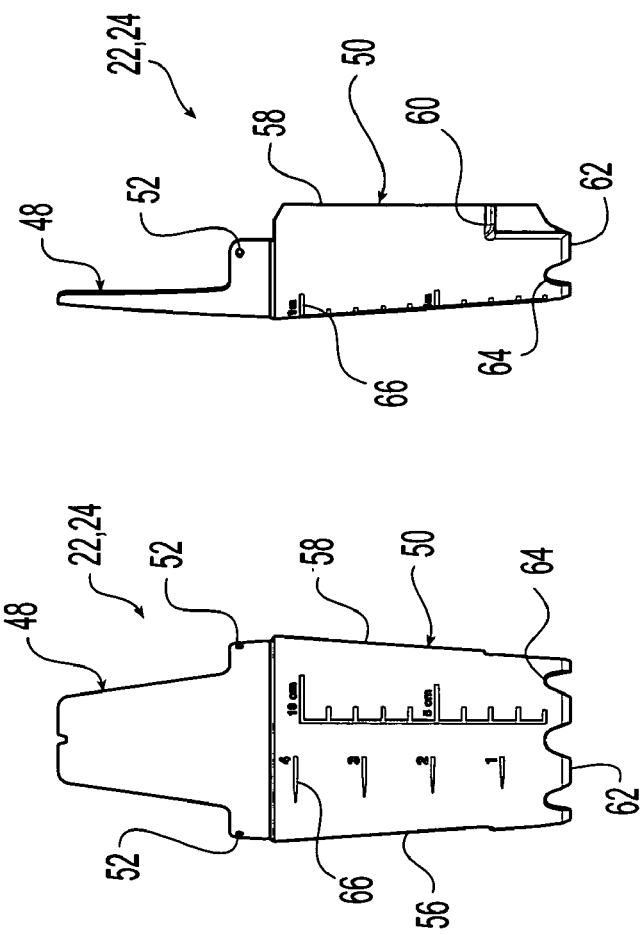
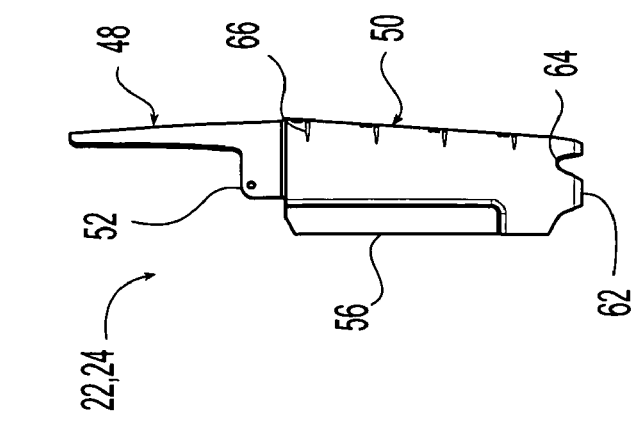

US 7,647,703 B2

BULB PLANTER WITH TWIN GRIPS

CROSS-REFERENCE TO RELATED APPLICATIONS

This application claims priority benefit of U.S. Provisional Patent Application No. 60/567,384 filed on Apr. 30, 2004, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to hand-operated tools for gardening and, more particularly, to bulb planters and the like.

BACKGROUND OF THE INVENTION

A variety of different hand-operated tools are commonly used for lawn and gardening tasks. Such as, for example, bulb planters are commonly used for planting flower bulbs. These bulb planters typically have a tool head, in the form cylindrical or frusto-conical shaped tube, with a handle rigidly attached to one end of the tube. The tool head is typically metal while the handle is typically wood but is sometimes metal. The tube is pushed into the ground, rotated and or twisted about a central vertical axis and then pulled out to remove a soil plug from the ground so that a plant or flower bulb can be placed in the hole created by removing the soil plug and then covered with the soil plug.

While these prior bulb planters may be adequate to perform their intended planting tasks under some conditions, they can be difficult and uncomfortable to grasp and hold, particularly with two hands, and can require the operator to have a relatively large amount of hand strength. Additionally, it can be difficult to remove the soil plug from the cylinder once the tool head has been removed from the ground. This can particularly be a concern when the hand tools are used by women, elderly, or handicapped users. Additionally, there is a never ending desire to improve certain characteristics of such bulb planters such as, for example, quality, reliability, versatility, weather-resistance, high strength, low weight, and low manufacturing costs. Accordingly, there is a need in the art for improved bulb planters.

SUMMARY OF THE INVENTION

The present invention provides a bulb planter which overcomes at least some of the above-noted problems of the related art. According to the present invention, a bulb planter comprises, in combination, a pair of blade halves cooperating to form a tubular tool head having a central longitudinal axis and a pair of handles operably connected to the blade halves to selectively move the blade halves. The blade halves are operatively hinged so that the blade halves pivot toward and away from each other between a soil plug cutting position and a soil plug releasing position upon movement of the handles.

According to another aspect of the present invention, a bulb planter comprises, in combination, a tubular cutting head having a central longitudinal axis and a pair of handles connected to the cutting head. The handles extend in opposed directions substantially perpendicular to the central longitudinal axis.

According to yet another aspect of the present invention, a bulb planter comprises, in combination, a pair of blade halves cooperating to form a tubular tool head having a central longitudinal axis and a molded plastic handle body forming a pair of handles. The blade halves are secured to the handle body. The handle body forms a living hinge for selectively pivoting the blade halves upon movement of the handles. The blade halves pivot toward and away from each other between a soil plug cutting position and a soil plug releasing position upon movement of the handles. A resilient member biases the blade halves toward the soil plug cutting position. The handles extend in opposed directions substantially perpendicular to the central longitudinal axis and are manually movable against the bias of the resilient member to move the blade halves to the soil plug release position.

From the foregoing disclosure and the following more detailed description of various preferred embodiments it will be apparent to those skilled in the art that the present invention provides a significant advance in the technology of bulb planters. Particularly significant in this regard is the potential the invention affords for providing a high quality, reliable, versatile, and easy to use bulb planter with improved operational performance. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 1 is a front elevational view of a bulb planter according to a preferred embodiment of the present invention;

FIG. 2 is a side elevational view of the bulb planter of FIG. 1;

FIG. 3 is a top plan view of the bulb planter of FIGS. 1 and 2;

FIG. 5 is a front elevational view of a main body of the bulb planter of FIGS. 1 to 4, wherein an over-mold layer is partially removed from the handgrips for clarity;

FIG. 6 is a side elevational view of the main body of FIG. 5, wherein an over-mold layer is partially removed from the handgrips for clarity;

FIG. 7 is a top plan view of the main body of FIGS. 5 and 6, wherein an over-mold layer is partially removed from the handgrips for clarity;

FIG. 8 is a cross-sectional view of the main body of FIGS. 5 to 7 taken along line 8-8 in FIG. 6;

FIG. 9 is a front elevational view of a blade of the bulb planter of FIGS. 1 to 4;

FIG. 10 is a side elevational view of the blade of FIG. 9;

FIG. 11 is a top plan view of the blade of FIGS. 9 and 10;

FIG. 12 is a rear elevational view of the blade of FIGS. 9 to 11;

Figure 4:
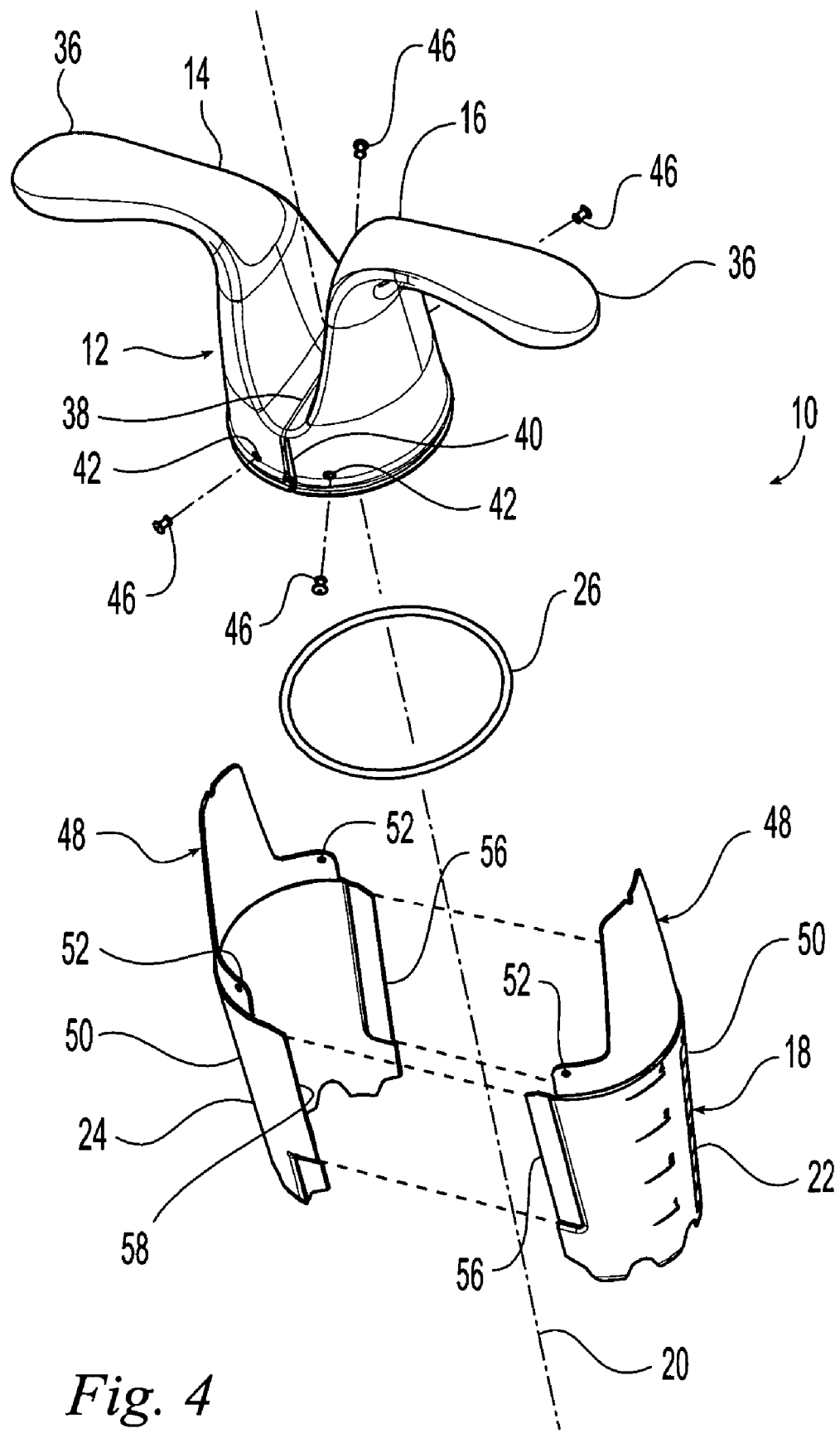
FIG. 4 is an exploded perspective view of the bulb planter of FIGS. 1 to 3 wherein an over-mold layer is removed from the hand grips for clarity.

It should be understood that the appended drawings are not necessarily to scale, presenting a somewhat simplified representation of various preferred features illustrative of the basic principles of the invention. The specific design features of the bulb planters as disclosed herein, including, for example, specific dimensions, orientations, materials, configurations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the bulb planter illustrated in the drawings. In general, up or upward refers to an upward direction within the plane of the paper in the FIG. 1 and down or downward refers to a downward direction within the plane of the paper in FIG. 1. Also in general, bottom refers to a tool head edge end of the end of the bulb planters and top refers to a handle end of the bulb planters opposite the tool head.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved hand tools disclosed herein. The following detailed discussion of various alternative and preferred embodiments will illustrate the general principles of the invention with reference to bulb planters for use in home and garden environments. Other embodiments suitable for other applications will be apparent to those skilled in the art given the benefit of this disclosure.

Referring now to the drawings, FIGS. 1 to 4 illustrates a bulb planter 10 according to a first preferred embodiment of the present invention. The illustrated bulb planter 10 includes a handle body 12 forming a pair of handles 14, 16 and a tubular tool or cutting head 18 downwardly extending from the handle body 12 and forming a central longitudinal axis 20 of the bulb planter 10. The illustrated cutting head 18 is formed by a pair of blade halves 22, 24 that pivot toward and away from each other between a soil plug cutting position (best shown in FIG. 13) and a soil plug releasing position (best shown in FIG. 14) upon movement of the handles 14, 16 as described in more detail hereinafter. The illustrated bulb planter 10 also includes a resilient member 26 biasing the blade halves 22, 24 toward the soil plug cutting position as described in more detail hereinafter.

As best shown in FIGS. 5 to 8, the illustrated handle body 12 has a tubular lower portion 28 and the pair of handles 14, 16 extending from the top of the lower portion 28. The lower portion 28 is formed by a cylindrical-shaped side wall 30 and a concave or grooved top wall 32 that cooperates with the handles 14, 16 to close the upper end of the lower portion 28. Thus, the illustrated lower portion 28 has a closed upper end and an open lower end. The illustrated handle body 12 has a circular groove 34 formed in the outer surface of the side wall 30 near the open bottom. The groove 34 is sized and shaped to receive the resilient member 26 as described in more detail herein after.

The handles 14 extend upward and laterally outward from the upper end of the handle body 12. The handles 14 are each provided with a hand grip 36. The illustrated hand grips 36 are generally cylindrically-shaped and extend in outwardly opposed directions so that they are generally coaxial. Formed in this manner the hand grips 36 are each substantially perpendicular to the central longitudinal axis 20. The illustrated hand grips 36 are each cantilevered outward in a direction away from the central longitudinal axis 20. The illustrated hand grips 36 have an ergonomic shape for comfortable gripping by the user but can alternatively can have any other suitable shape.

The illustrated handle body 12 has a living hinge 38 formed in the top wall 32 between the handles 14, 16. It is noted that any other suitable type of hinge 38 can alternatively be utilized. The illustrated handle body 12 also has a pair of slits or slots 40 in the side wall 30 which vertically extend from the bottom edge of the side wall 30 to the ends of the hinge 38 so that the hinge 38 is all that connects the two sides of the handle body 12 and each of the sides has one of the handles 14, 16 associated therewith. The illustrated side wall 30 is provided with openings 42 for securing the blade halves 22, 24 thereto as described in more detail hereinafter. The illustrated side wall 30 has two openings 42 provided on each side but any other suitable quantity of openings 42 can alternatively be utilized. The hinge 38 and slots 40 are sized and shaped so that the sides of the handle body 12 and the blade halves 22, 24 secured thereto can be selectively pivoted upon movement of the handles 14, 16.

The handle body 12 is preferably molded of plastic but any other suitable material can alternatively be utilized. It is noted that the illustrated sides of the handle body 12, hinge 38, and handles 14, 16 are molded of plastic as an integral, one-piece component. The handle body 12 is preferably molded of a polypropylene copolymer but any other suitable plastic can alternatively be utilized. The illustrated hand grips 36 are additionally provided with an over-molded layer 44 of a softer plastic to provide a cushioned and/or slip resistant gripping surface. The over-mold layer 44 is preferably molded of TPR shore A 60 but any other suitable plastic can alternatively be utilized.

As best shown in FIGS. 1 to 4, the illustrated cutting head 18 is in the form of a cylindrical or slightly frusto-conical shaped blade formed by the first and second blade halves 22, 24 which are pivotally connected together at their upper ends by the handle body 12 so that the lower ends of the blade halves 22, 24 can be selectively flexed outwardly apart to the soil plug releasing position. The illustrated blade halves 22, 24 are secured to the handle body 12 by fasteners 46 such as, for example the illustrated rivets so that the blade halves 22, 24 are secured on the opposite sides of the hinge 38. It is noted that the blade halves 22, 24 can alternatively be secured in any other suitable manner or formed unitary with the handle body 12.

As best shown in FIGS. 9 to 12, the blade halves 22, 24 each have an upper or attachment portion 48 and a lower or cutting portion 50. The lower portions 50 are sized and shaped to cooperatively form the tubular cutting head outside and below the handle body 12. The upper portions 50 are each sized and shaped to extend within the handle body 12 for securing the blade halves 22, 24 thereto. The illustrated upper portion 48 is provided with openings 52 sized, shaped and positioned to cooperate with the openings 42 of the handle body 12 to receive the fasteners 46 for securing the blade halves 22, 24 to the handle body 12. The illustrated blade half 22, 24 has two openings 52 provided but any other suitable quantity of the openings 52 can alternatively be utilized. The illustrated upper portions 48 are also sized and shaped to extend within the handle body 12 to the handles 14, 16. The illustrated handle body 12 is provided with grooves or channels 54 (best shown in FIG. 8) for receiving upper edges of the blade half upper portions 48 therein. The blade halves 22, 24 are preferably formed and directly secured to the handles 14, 16 in this manner to ensure that the blade halves 22, 24 pivot as desired upon movement of the handles 14, 16.

The illustrated blade halves 22, 24 are also sized and shaped to overlap along their side edges 56, 58, that is, at least a portion of one the blade halves 22, 24 overlies the other one of the blade halves 22, 24 at each side edge 56, 58 so that there is not a gap or opening between the blade halves 22, 24 when in the soil plug cutting position. The illustrated blade halves 22, 24 are also sized and shaped to interlock at each of the side edges 56, 58 so that the side edges 56, 58 do not deform or bend to create a gap or opening between the blade halves 22, 24 when in the soil plug cutting position. The illustrated blade halves 22, 24 interlock by forming the first side edge 56 with an upper portion sized and shaped to underlie an upper portion of the cooperating second side edge 58 and a lower portion sized and shaped to overlie a lower portion of the cooperating second side edge 58. The second side edge 58 has an upper portion sized and shaped to overlie the upper portion of the cooperating first side edge 56 and a lower portion sized and shaped to underlie the lower portion of the cooperating first side edge 56. The illustrated blade halves 22, 24 each have both a first and second side edge 56, 58 so that the blade halves 22, 24 are identical. The blade halves 22, 24, however, can alternatively be provided with both first side edges 56 and both second edges 58 respectively as long as cooperating edges are provided to mate the two blade halves 22, 24 together. The illustrated second side edge 58 is also provided with a slot 60 located between the upper and lower portions for passage of the first side edge 56 therethrough. It is noted that the slot 60 can alternatively or additionally be formed in the first side edge 56. It is also noted that the side edges 56, 58 can overlap and/or interlock in any other suitable manner.

The illustrated blade halves 22, 24 have lower portions 50 forming a sharp lower edge 62 having serrations or teeth 64. The illustrated blade halves 22, 24 are also provided with a depth scale 66 which indicates the distance from the lower edge 62 so that the user can determine the depth which the cutting head 18 has been inserted into the ground. The illustrated depth scale 66 is stamped therein but alternatively can be molded, engraved, printed, painted or otherwise provided thereon. The blade halves 22, 24 are preferably stamped of metal but can alternatively be formed of any other suitable material such as, for example, plastic. The illustrated blade halves 22, 24 are stamped of 18 gage C1035 steel but any other suitable sizes and types of metal can alternatively be utilized.

As best shown in FIGS. 1 to 4, the illustrated resilient member 26 is an elastomer ring positioned within the groove 34 of the handle body 12 so that the resilient member 26 encircles both the lower end of the handle body 12 and the upper portions 48 of the blade halves 22, 24 below the hinge 38. The resilient member 26 is sized and shaped to bias the blade halves 22, 24 into the soil plug cutting position and to permit the handles 14, 16 to be manually moved against the bias of the resilient member 26 to move the blade halves 22, 24 from the soil plug cutting position to the soil plug release position. The illustrated elastomer ring 26 is a rubber o-ring but any other suitable elastomer ring can alternatively be utilized. It is also noted that any other suitable type resilient member 26 can alternatively be utilized to bias the blade halves 22, 24 into the soil plug cutting position or any other desired position.

Figure 13:
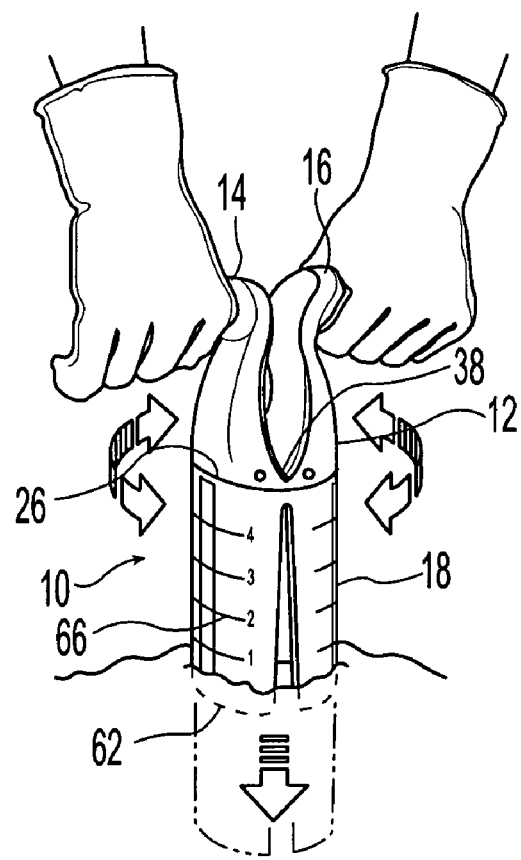
FIG. 13 is a diagrammatic view of the bulb planter of FIGS. 1 to 4 showing a user applying a force to drive the bulb planter into the ground and twist the bulb planter to cut a soil plug.
Figure 14:
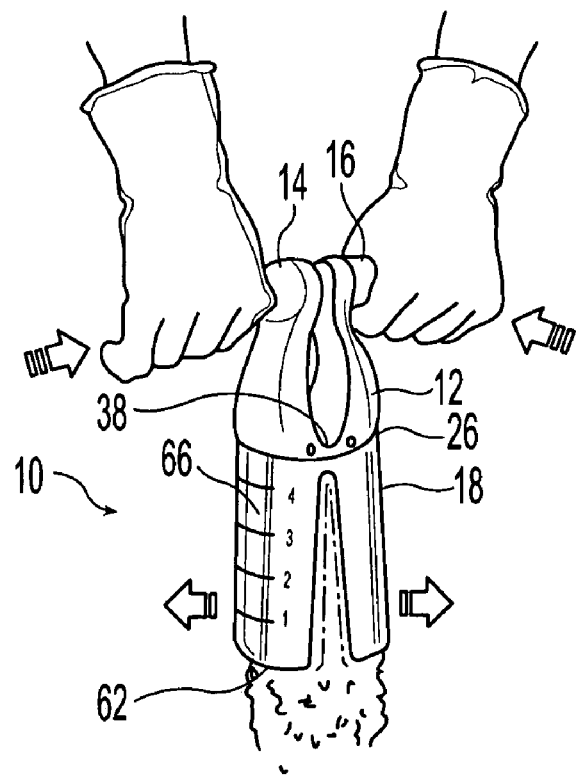
FIG. 14 is a diagrammatic view of the bulb planter of FIG. 13 showing the user applying a force to the bulb planter to remove the soil plug after the bulb planter is withdrawn from the ground.

As best shown in FIG. 13, the user grasps the bulb planter 10 with two hands wherein one of the user's hands is located on the first handle 14 and the other of the user's hands is located on the second handle 16. The user applies a downward force to drive the lower edge 62 of the cutting head 18 into the ground while making a twisting or rotating motion about the central longitudinal axis 20 until the depth scale 66 indicates that the cutting head 18 is in the ground a desired depth to cut a desired size of soil plug. The user then applies an upward force to the handles 14, 16 to remove the cutting head 18 from the ground with the soil plug still located therein. As best shown in FIG. 14, the user then applies and inward force to the handles 14, 16 toward the central longitudinal axis 20 to overcome the bias of the resilient member 26 and pivot the blade halves 22, 24 about the hinge 38 from the soil plug cutting position to the soil plug release position. With the blade halves 22, 24 in the soil plug release position, the blade halves 22, 24 are separated so that the soil plug simply falls out of the cutting head 18.

It is apparent from the foregoing detailed description that the present invention provides an improved bulb planter 10 which is relatively comfortable to use, requires relatively low strength, and reduces instability during use. It is also apparent that the improved bulb planter 10 provides a split cutting head 18 which easily dislodges the soil plug and has two separate hand grips 36 which can be used with a variety of positions for comfort, control and power. It is further apparent that the present invention provides a bulb planter 10 which can alternatively have a split cutting head 18 without the illustrated twin handles 14, 16 or could have two separate handles 14, 16 without a split cutting head 18 within the scope of the present invention.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A bulb planter comprising, in combination:
   a pair of blade halves cooperating to form a tubular tool head having a central longitudinal axis;
   a pair of handles operably connected to the blade halves to selectively move the blade halves; and
   wherein the blade halves are operatively hinged so that the blade halves pivot toward and away from each other upon movement of the handles between a soil plug cutting position wherein side edges of the blade halves are together to form the tubular tool head and lower ends of the blade halves form a substantially circular lower cutting edge so that a soil plug can be cut by the tool head and a soil plug releasing position wherein the side edges of the blade halves are separated and the lower ends of the blade halves are moved outward away from one another relative to the soil plug cutting position so that the soil plug falls out of the tool head.

2. The bulb planter according to claim 1, wherein the handles extend in opposed directions substantially perpendicular to the central longitudinal axis.

3. The bulb planter according to claim 2, wherein the handles are each cantilevered outward in a direction away from the central longitudinal axis.

4. The bulb planter according to claim 2, wherein the handles move inwardly toward each other to move the blade halves to the soil plug release position.

5. The bulb planter according to claim 1, wherein the handles are each formed by a molded plastic handle body and the blade halves are each secured to a respective body.

6. The bulb planter according to claim 5, wherein the blade halves comprise metal and have a serrated lower cutting edge.

7. The bulb planter according to claim 5, wherein the blade halves comprise metal and are riveted to the handle body.

8. The bulb planter according to claim 5, wherein the handle body forms a living hinge for pivoting the blade halves.

9. The bulb planter according to claim 1, further comprising a resilient member biasing the blade halves inwardly from the soil plug releasing position toward the soil plug cutting position.

10. The bulb planter according to claim 9, wherein the resilient member comprises an elastomer ring encircling the blade halves coaxial with the central longitudinal axis.

11. The bulb planter according to claim 1, wherein the blade halves pivot about a living hinge.

12. The bulb planter according to claim 1, wherein the side edges of the blade halves overlap when in the soil plug cutting position.

13. A bulb planter comprising, in combination:
a tubular cutting head having a central longitudinal axis;
a pair of handles connected to the cutting head;
wherein the handles extend in opposed directions substantially perpendicular to the central longitudinal axis; and
wherein the tubular cutting head includes a pair of blade halves operatively hinged so that the blade halves pivot toward and away from each other upon movement of the handles between a soil plug cutting position wherein side edges of the blade halves are together to form the tubular cutting head and lower ends of the blade halves form a substantially circular lower cutting edge so that a soil plug can be cut by the cutting head and a soil plug releasing position wherein the side edges of the blade halves are separated and the lower ends of the blade halves are moved outward away from one another relative to the soil plug cutting position so that the soil plug falls out of the tubular cutting head.

14. The bulb planter according to claim 13, wherein the handles are each cantilevered outward in a direction away from the central longitudinal axis.

15. The bulb planter according to claim 13, wherein the handles are formed by a molded plastic handle body and the cutting head is secured to the body.

16. The bulb planter according to claim 15, wherein the cutting head comprises metal and has a serrated lower cutting edge.

17. The bulb planter according to claim 15, wherein the cutting head comprises metal and is riveted to the handle body.

18. The bulb planter according to claim 13, wherein a resilient member biases the blade halves inwardly from the soil plug releasing position toward the soil plug cutting position.

19. The bulb planter according to claim 18, wherein the resilient member comprises an elastomer ring encircling the blade halves coaxial with the central longitudinal axis.

20. The bulb planter according to claim 13, wherein the side edges of the blade halves overlap when in the soil plug cutting position.

21. A bulb planter comprising, in combination:
a pair of blade halves cooperating to form a tubular tool head having a central longitudinal axis;
a molded plastic handle body forming a pair of handles;
wherein the blade halves are secured to the handle body;
wherein the handle body forms a living hinge for selectively pivoting the blade halves upon movement of the handles;
wherein the blade halves pivot toward and away from each other upon movement of the handles between a soil plug cutting position wherein side edges of the blade halves are together to form the tubular tool head and lower ends of the blade halves form a substantially circular lower cutting edge so that a soil plug can be cut by the tool head and a soil plug releasing position wherein the side edges of the blade halves are separated and the lower ends of the blade halves are moved outward away from one another relative to the soil plug cutting position so that the soil plug falls out of the tool head;
a resilient member biasing the blade halves inwardly from the soil plug releasing position toward the soil plug cutting position; and
wherein the handles extend in opposed directions substantially perpendicular to the central longitudinal axis and are manually movable against the bias of the resilient member to move the blade halves to the soil plug release position.

22. The bulb planter according to claim 21, wherein the resilient member comprises an elastomer ring encircling the blade halves coaxial with the central longitudinal axis.

23. The bulb planter according to claim 21, wherein the side edges of the blade halves overlap when in the soil plug cutting position.

* * * * *